UNITED STATES PATENT OFFICE.

ARNO BEHR, OF CHICAGO, ILLINOIS.

METHOD OF MAKING STARCH AND CATTLE-FOOD.

SPECIFICATION forming part of Letters Patent No. 491,234, dated February 7, 1893.

Application filed October 28, 1892. Serial No. 450,266. (No specimens.)

*To all whom it may concern:*

Be it known that I, ARNO BEHR, of Chicago, Illinois, have invented certain Improvements in By-Products Resulting from the Manufacture of Starch from Indian Corn, of which the following is a specification.

In the manufacture of starch from Indian corn, the first step consists in steeping the corn in a weak solution of sulphurous acid in water for the purpose of softening the corn preparatory to grinding. Having been thus softened the corn is ground and mixed with water. The hulls and germs are separated from the liquid thus formed, which is known as starch milk and which is caused to flow over slightly inclined tables upon which the starch settles while the gluten is carried off by the liquid which flows from the lower end of the starch table.

Various methods are employed for saving the gluten thus discharged from the starch tables, but the steeping water of the corn has heretofore been thrown away as waste.

The present invention is based upon the observation that during the steeping operation considerable proportions of the natural constituents of the corn become dissolved and hence have heretofore been wasted. The soluble material thus heretofore wasted consists of albuminoids, sugar and other hydrocarbons, phosphates, and potassium salts which are valuable for cattle food. The attempt to obtain these substances in a dry and concentrated form by evaporation of the water in which they are dissolved, is frustrated by the nature of the mass which remains after most of the water has been evaporated; this mass forming a viscous sirup which cannot be reduced to complete dryness without undergoing chemical changes, and which even when dry is hygroscopic and becomes sticky and deliquescent from access of moist air. It is also to be observed that certain by-products of the same process which remain after the starch has been separated and which are used as cattle food are deficient in those soluble constituents of corn which have been removed in the process of steeping and grinding. These by-products are known as corn bran, gluten meal and maize feed, which is a mixture of the first two named materials. In the aggregate they represent the residue of insoluble constituents of corn which is left after the starch has been extracted from it.

In particular, corn bran is that part of the corn which remains on a fine screen when the corn, after grinding, is washed with water over such a screen. The said residue is prepared for use by being pressed and dried. Gluten meal is extracted from that part of the corn which has passed through the fine screen and from which the starch has been separated by settlement. It is collected in filter presses, dried and ground. Now I have found, when the steeping water is concentrated to the consistency of a sirup, and is then mixed in a suitable proportion with an absorbent consisting of either or both of the said by-products, that the mixture can be completely dried in an ordinary drying apparatus and does not become moist or sticky when it is exposed to the air, at the same time the said by-products or feed stuffs receive back a proportion of the soluble constituents of corn which were heretofore lost in the ordinary process of manufacturing starch and therefore their feeding value is considerably increased.

The present improvement is carried out as follows: The steeping water is obtained in the ordinary way by immersing corn in a dilute watery solution of sulphurous acid of a slightly elevated temperature and allowing it to remain therein until it is thoroughly softened. This steeping water, when withdrawn from the corn, contains, besides the soluble constituents of corn, small amounts of sulphites and free sulphurous acid. Owing to their taste the presence of these latter substances is objectionable in cattle food and I have therefore devised means to remove them. I ascertain by chemical test the total amount of sulphurous acid present in a given quantity of steeping water and add thereto the chemically equivalent amount of sulphuric or other strong acid. For example, for one hundred pounds of sulphurous acid ($SO_2$) contained in a tank full of steeping water I add one hundred and sixty four pounds of sulphuric acid of 66° Baumé density. Or I add the chemically equivalent amount of hydrochloric or other strong acids, using in place of one hundred pounds of sulphurous acid ($SO_2$) two hundred and thirty pounds of hydrochloric acid of 20° Baumé density. The effect of such addition of sulphuric or other strong acid is that the sulphurous acid is set free and, during the subsequent evaporation, is carried away with the steam, while the added acid combines with the basic substances with which the sulphurous acid was previously combined and forms salts which are free of the objectionable properties of the sulphites.

It may be found in some cases that it is not required to add the full theoretically equivalent quantity of sulphuric or other acids to effect the desired result, viz., the expulsion of the sulphurous acid and if, upon chemical examination, it is found that a smaller amount is sufficient, such smaller amount will of course be used; but in no case should the theoretically equivalent amount be exceeded.

I then evaporate the steeping water in any suitable evaporating apparatus until it is concentrated to a sirup containing from forty to fifty per cent. of solid material. With this sirup I mix either dry or partly dried corn bran, gluten meal or both, in such proportion as it is desired to enrich the latter with the soluble material contained in the steeping water. For example, if it be desired to produce a dry product containing, say, ninety parts of dry gluten meal and ten parts of dry material from the sirup, one hundred parts of gluten meal containing, say, ninety per cent. of solid material will be mixed with twenty parts of sirup containing, say, fifty per cent. of solid material. This mixture may be effected either manually or by means of any of the well known forms of mixing appliances, such, for example, as a screw conveyer into which the gluten meal and sirup are introduced continuously in prescribed relative proportions. The resulting mixture is dried in any suitable drying apparatus, such as is commonly used for drying granular substances, and when dried may, if desired, be reduced to the form of meal by grinding or otherwise. In any case the dried mixture is a merchantable product adapted for use as cattle food.

I claim as my invention—

1. The herein described method of treating Indian corn for the manufacture therefrom of starch and of a rich cattle food; which consists in first steeping the corn in a watery solution of sulphurous acid, then removing the corn and grinding and mixing it with water and separating and collecting the starch, corn bran and gluten from the resulting mixture by the ordinary methods; secondly, in adding to the steeping water, after the corn has been removed therefrom, an amount of strong acid, such as sulphuric acid, which is chemically equivalent to the amount of sulphurous acid present in the steeping water, then evaporating the greater part of the steeping water, then forming a mixture of the resulting condensed liquid with an absorbent such as corn bran, or gluten meal, or both corn bran and gluten meal, and in finally drying the resulting mixture.

2. As a by-product of the manufacture of starch from Indian corn, a meal in dry form suitable for cattle food, composed of certain nutritive ingredients consisting of the albuminoids, sugar, carbohydrates, phosphates and potassium salts obtained from the water in which the corn has been soaked, and an absorbent.

3. As a by-product of the manufacture of starch from Indian corn, a meal in dry form suitable for cattle food, composed of certain nutritive ingredients consisting of the albuminoids, sugar, carbohydrates, phosphates and potassium salts obtained from the water in which the corn has been soaked, and gluten meal.

ARNO BEHR.

Witnesses:
HERMAN C. RAHN,
WM. GRUBER.